US012621775B2

(12) United States Patent
Liao et al.

(10) Patent No.: US 12,621,775 B2
(45) Date of Patent: May 5, 2026

(54) METHOD AND APPARATUS FOR POWER SAVING ENHANCEMENTS WITH A WAKE-UP SIGNAL FOR A DUAL-RADIO SYSTEM

(71) Applicant: MediaTek Inc., Hsinchu (TW)

(72) Inventors: Yi-Ju Liao, Hsinchu (TW); Wei-De Wu, Hsinchu (TW)

(73) Assignee: MediaTek Inc., Hsinchu City (TW)

( * ) Notice: Subject to any disclaimer, the term of this patent is extended or adjusted under 35 U.S.C. 154(b) by 0 days.

(21) Appl. No.: 18/129,044

(22) Filed: Mar. 30, 2023

(65) Prior Publication Data

US 2023/0345377 A1      Oct. 26, 2023

Related U.S. Application Data

(60) Provisional application No. 63/334,323, filed on Apr. 25, 2022.

(51) Int. Cl.
*H04W 52/02* (2009.01)
*H04W 16/28* (2009.01)

(52) U.S. Cl.
CPC ......... *H04W 52/028* (2013.01); *H04W 16/28* (2013.01)

(58) Field of Classification Search
CPC .............. H04W 52/028; H04W 16/28; H04W 52/0229; H04W 52/0225; H04W 88/06; Y02D 30/70
See application file for complete search history.

(56) References Cited

U.S. PATENT DOCUMENTS

| | | | | |
|---|---|---|---|---|
| 12,363,638 | B2 * | 7/2025 | Agardh | H04W 48/02 |
| 2017/0070959 | A1 | 3/2017 | Khazanov et al. | |
| 2017/0230889 | A1 * | 8/2017 | Zheng | H04W 40/005 |
| 2019/0327679 | A1 * | 10/2019 | Gupta | H04W 52/0229 |
| 2020/0022082 | A1 * | 1/2020 | Ljung | H04J 13/0048 |
| 2020/0145921 | A1 * | 5/2020 | Zhang | H04W 52/0235 |
| 2023/0023422 | A1 * | 1/2023 | Beale | H04W 52/028 |
| 2023/0189139 | A1 * | 6/2023 | Priyanto | H04L 27/26025 370/311 |
| 2023/0269666 | A1 * | 8/2023 | Wu | H04W 52/0235 370/311 |
| 2023/0345377 | A1 * | 10/2023 | Liao | H04W 52/028 |
| 2024/0397422 | A1 * | 11/2024 | Martin | H04W 52/0235 |

FOREIGN PATENT DOCUMENTS

WO      WO 2021183659 A1      9/2021

OTHER PUBLICATIONS

Taiwan Intellectual Property Office, Office Action in Taiwan Patent Application No. 112115062, Jan. 31, 2024.

* cited by examiner

*Primary Examiner* — Afshawn M Towfighi
(74) *Attorney, Agent, or Firm* — Andy M. Han; Han IP PLLC

(57) ABSTRACT

Various solutions for power saving enhancements with a wake-up signal for a dual-radio system are described. An apparatus may configure a main radio of the apparatus to enter a sleep mode and a secondary radio of the apparatus to be in an active mode. The apparatus may receive, via the secondary radio, a first signal from a network node. The apparatus may apply the first signal for at least one of: a time or frequency synchronization with the network node; an indication of whether to wake up the main radio from the sleep mode; and a signal quality measurement.

18 Claims, 6 Drawing Sheets

100

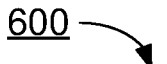

600

CONFIGURING, BY A PROCESSOR OF AN APPARATUS, A MAIN RADIO OF THE APPARATUS TO ENTER A SLEEP MODE AND A SECONDARY RADIO OF THE APPARATUS TO BE IN AN ACTIVE MODE
610

RECEIVING, VIA THE SECONDARY RADIO, A FIRST SIGNAL FROM A NETWORK NODE
620

APPLYING, BY THE PROCESSOR, THE FIRST SIGNAL FOR AT LEAST ONE OF:
A TIME OR FREQUENCY SYNCHRONIZATION WITH THE NETWORK NODE;
AN INDICATION OF WHETHER TO WAKE UP THE MAIN RADIO FROM THE SLEEP MODE; AND
A SIGNAL QUALITY MEASUREMENT
630

FIG. 6

METHOD AND APPARATUS FOR POWER SAVING ENHANCEMENTS WITH A WAKE-UP SIGNAL FOR A DUAL-RADIO SYSTEM

CROSS REFERENCE TO RELATED PATENT APPLICATION(S)

The present disclosure claims the priority benefit of U.S. Provisional Patent Application No. 63/334,323, filed on 25 Apr. 2022. The contents of aforementioned application are herein incorporated by reference in their entirety.

TECHNICAL FIELD

The present disclosure is generally related to mobile communications and, more particularly, to power saving enhancements with a wake-up signal for a dual-radio system.

BACKGROUND

Unless otherwise indicated herein, approaches described in this section are not prior art to the claims listed below and are not admitted as prior art by inclusion in this section.

Power saving is one of the most important issues in any wireless communication system, and its importance is even more relevant for mobile devices, such as smartphones, which have limited amount of power source (e.g., battery) comparing to other type of devices, such as fixed wireless customer premise equipment (CPE) or devices mounted on a vehicle. This issue has become more important in $5^{th}$ Generation (5G) New Radio (NR) since it has been observed that mobile devices (and even the base stations) tend to consume power more quickly when they are operating in 5G NR than in other legacy technologies (e.g., Long-Term Evolution (LTE)).

To save power, a mobile device (or called a user equipment (UE)) may enter a radio resource control (RRC) idle or inactive state when there is no data traffic, but the UE has to monitor whether the wireless network is sending any paging message to it and it has to spend some energy to run this "monitoring" process. In the RRC idle/inactive state, the UE may stay in a sleep mode in a discontinuous reception (DRX) cycle. The UE may periodically wake up and monitor physical downlink control channel (PDCCH) in a DRX ON duration to check for the presence of a paging message. If the PDCCH indicates that a paging message is transmitted in a subframe, then the UE may demodulate the paging channel to see if the paging message is directed to it. Otherwise, the UE may stay in the sleep mode in a DRX OFF duration since the wireless network will not be transmitting any data to the UE in the DRX OFF duration.

In $3^{rd}$ Generation Partnership Project (3GPP) Release-16 for 5G NR, a wake-up signal (WUS) is introduced to enhance power saving for paging reception, by allowing the UE to only wake up in a DRX ON duration if a received WUS indicates the UE to wake up for the DRX ON duration. That is, the UE is allowed to skip a DRX ON duration if the received WUS indicates otherwise, so that the UE may stay in the sleep mode for a longer period of time. However, the R-16 WUS is used only for the purpose of data scheduling indication, and is designed for UEs with a single-radio architecture. The single radio is generally a power-hungry transceiver that is capable of complicated radio frequency (RF) signal processing, such as modulation and demodulation, and the receiver area size may not suit for compact devices or small form-factor devices, such as Internet-of-Things (IoT) devices or wearable devices.

Therefore, a solution is sought to further improve the power saving issues.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues pertaining to power saving enhancements with a wake-up signal for a dual-radio system.

In one aspect, a method may involve an apparatus configuring a main radio of the apparatus to enter a sleep mode and a secondary radio of the apparatus to be in an active mode. The method may also involve the apparatus receiving, via the secondary radio, a first signal from a network node. The method may also involve the apparatus applying the first signal for at least one of: a time or frequency synchronization with the network node; an indication of whether to wake up the main radio from the sleep mode; and a signal quality measurement.

In one aspect, an apparatus may comprise a transceiver which, during operation, wirelessly communicates with a network node of a wireless network, wherein the transceiver comprises a main radio and a secondary radio. The apparatus may also comprise a processor communicatively coupled to the transceiver. The processor, during operation, may perform operations comprising configuring the main radio to enter a sleep mode and the secondary radio to be in an active mode; receiving, via the secondary radio, a first signal from the network node; and applying the first signal for at least one of: a time or frequency synchronization with the network node; an indication of whether to wake up the main radio from the sleep mode; and a signal quality measurement.

It is noteworthy that, although description provided herein may be in the context of certain radio access technologies, networks and network topologies such as Long-Term Evolution (LTE), LTE-Advanced, LTE-Advanced Pro, 5th Generation (5G), New Radio (NR), Internet-of-Things (IoT) and Narrow Band Internet of Things (NB-IoT), Industrial Internet of Things (IIoT), and 6th Generation (6G), the proposed concepts, schemes and any variation(s)/derivative(s) thereof may be implemented in, for and by other types of radio access technologies, networks and network topologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

FIG. 6 is a flowchart of an example process in accordance with an implementation of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to power saving enhancements with a wake-up signal for a dual-radio system. According to the present disclosure, a number of possible solutions may be implemented separately or jointly. That is, although these possible solutions may be described below separately, two or more of these possible solutions may be implemented in one combination or another.

In $3^{rd}$ Generation Partnership Project (3GPP), a radio access network (e.g., 5G New Radio (NR) access network) may include a plurality of base stations (e.g., Next Generation Node-Bs (gNBs)) to communicate with a plurality of mobile stations referred as user equipment (UEs). Paging is a procedure the wireless network uses to find out the location of a UE, before the actual connection establishment. For example, paging is used to alert the UE of an incoming session (e.g., a call). In most cases, the paging process happens while UE is in the radio resource control (RRC) idle state (or called RRC idle mode). This means that UE has to monitor whether the wireless network is sending any paging message to it and it has to spend some energy to run this "monitoring" process. In the RRC idle state, a UE gets into and stays in a sleep mode defined in discontinuous reception (DRX) cycle. The UE periodically wakes up and monitors physical downlink control channel (PDCCH) to check for the presence of a paging message. If the PDCCH indicates that a paging message is transmitted in a subframe, then the UE demodulates the signal received on the paging channel to see if the paging message is directed to it.

Figure 1:
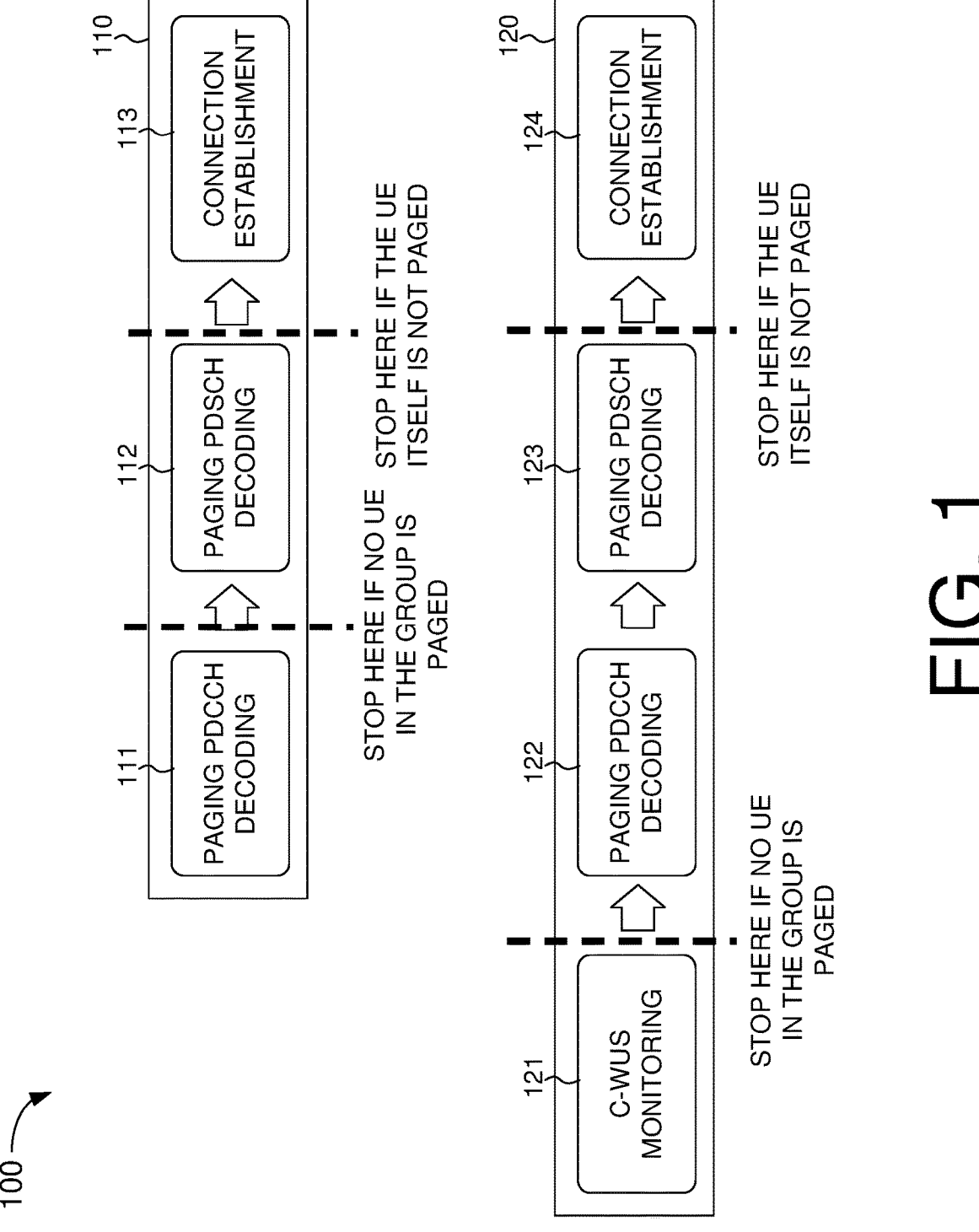
FIG. 1 is a diagram depicting an example scenario of a paging reception procedure in a single-radio system.

In 3GPP Release-17 for 5G NR, a wake-up signal (WUS) is introduced to enhance power saving for paging reception. FIG. 1 illustrates an example scenario 100 of a paging reception procedure in a single-radio system. As shown in scenario 100, top diagram 110 depicts a paging reception procedure without R-17 WUS, while bottom diagram 120 depicts a paging reception procedure with R-17 WUS (or called conventional WUS (C-WUS)). Note that a subgroup of UEs may be associated with the same PO. During the paging reception procedure in diagram 110, a UE may periodically wake up and perform paging PDCCH decoding (denoted as 111 in FIG. 1). If no UE in the UE subgroup is paged, then the UE may stop paging PDCCH decoding and enter the light sleep mode. Otherwise, if a UE in the UE subgroup is paged, the UE may perform paging physical downlink shared channel (PDSCH) decoding (denoted as 112 in FIG. 1). If the UE itself is not paged, then the UE may stop paging PDSCH decoding and enter the deep sleep mode. Otherwise, the UE may perform connection establishment (denoted as 113 in FIG. 1). During the paging reception procedure in diagram 120, a UE may periodically wake up and check for C-WUS first (denoted as 121 in FIG. 1). If no UE in the UE subgroup is paged, then the UE may stop C-WUS monitoring and enter the deep sleep mode. Otherwise, if a UE in the UE subgroup is paged, the UE may perform paging PDCCH decoding (denoted as 122 in FIG. 1) as well as paging PDSCH decoding (denoted as 123 in FIG. 1). If the UE itself is not paged, then the UE may stop paging PDSCH decoding and enter the deep sleep mode. Otherwise, if the UE itself is paged, the UE may perform connection establishment (denoted as 124 in FIG. 1).

Under the paging reception procedure in diagram 120, the UE can skip PO monitoring if the received C-WUS indicates no paging (i.e., there is no paging for the UE's subgroup). The UE's main radio is turned on in every paging cycle, for LOOP operations, measurements (MEAS), and C-WUS monitoring. If the received C-WUS indicates no paging, then after performing required measurements, UE may turn off its main radio and enter the deep sleep mode, e.g., until the next C-WUS. It should be noted that C-WUS is used only for the purpose of paging indication, and is designed for common UEs with a single-radio architecture. That is, the main radio is the only radio which is generally a high-power (or called power-hungry) transceiver capable of complicated radio frequency (RF) signal processing, such as modulation and demodulation, and the receiver area size may not suit for compact devices or small form-factor devices, such as Internet-of-Things (IoT) devices or wearable devices.

Figure 2:
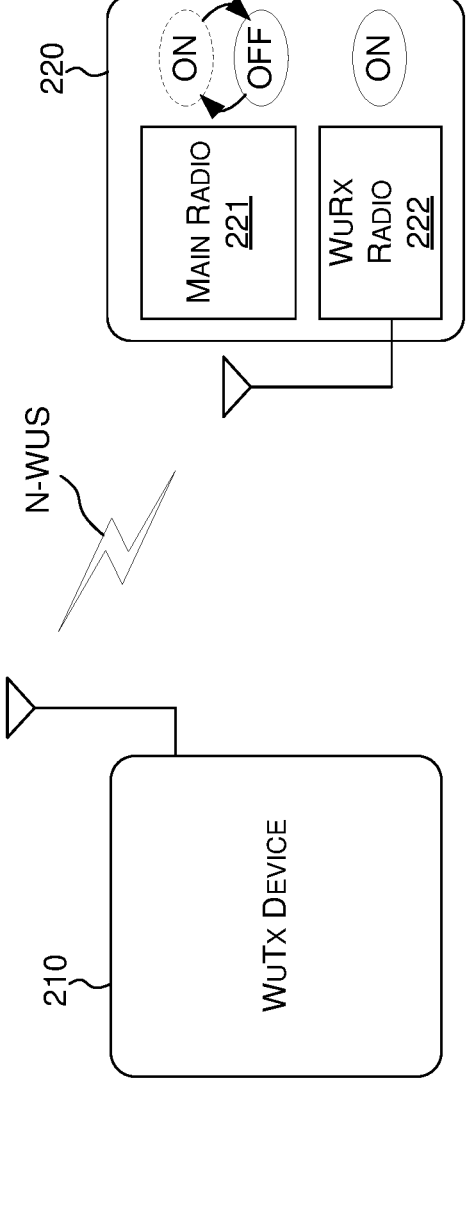
FIG. 2 is a diagram depicting an example dual-radio system under schemes in accordance with implementations of the present disclosure.

FIG. 2 illustrates an example dual-radio system 200 having a WuTx device 210 and a dual-radio device 220 in accordance with implementations of the present disclosure. The WuTx device 210 may be implemented in a gNB or a Transmission or Reception Point (TRP), and may send a novel/new WUS (denoted as N-WUS in FIG. 2) (or called a low-power (LP) WUS) to the WuRx radio 222 of the dual-radio device 220. The dual-radio device 220 may be implemented in a UE with a dual-radio architecture. The dual-radio device 220 includes a main radio 221 for handling synchronization signal block (SSB)/tracking reference signal (TRS) reception, paging PDCCH decoding, paging PDSCH decoding, and connection establishment, etc., and a WuRx radio 222 for handling N-WUS monitoring. It is noteworthy that the main radio 221 stays in a sleep mode (e.g., turned off or operating in a low-power mode or deep sleep mode) by default, while the WuRx radio 222 always stays in an active mode (e.g., turned on) for N-WUS monitoring and wakes up (i.e., turns on) the main radio 221 when an N-WUS is received. In some implementations, the main radio 221 is a high-power transceiver with a larger receiver area size, while the WuRx radio 222 is a low-power receiver with a smaller receiver area size. In some implementations, the N-WUS is in a specific waveform that the WuRx radio 222 is capable of processing without waking up the main radio 221. For example, the specific waveform of the N-WUS may not require complicated signal processing, such as demodulation and/or decoding.

Figure 3:
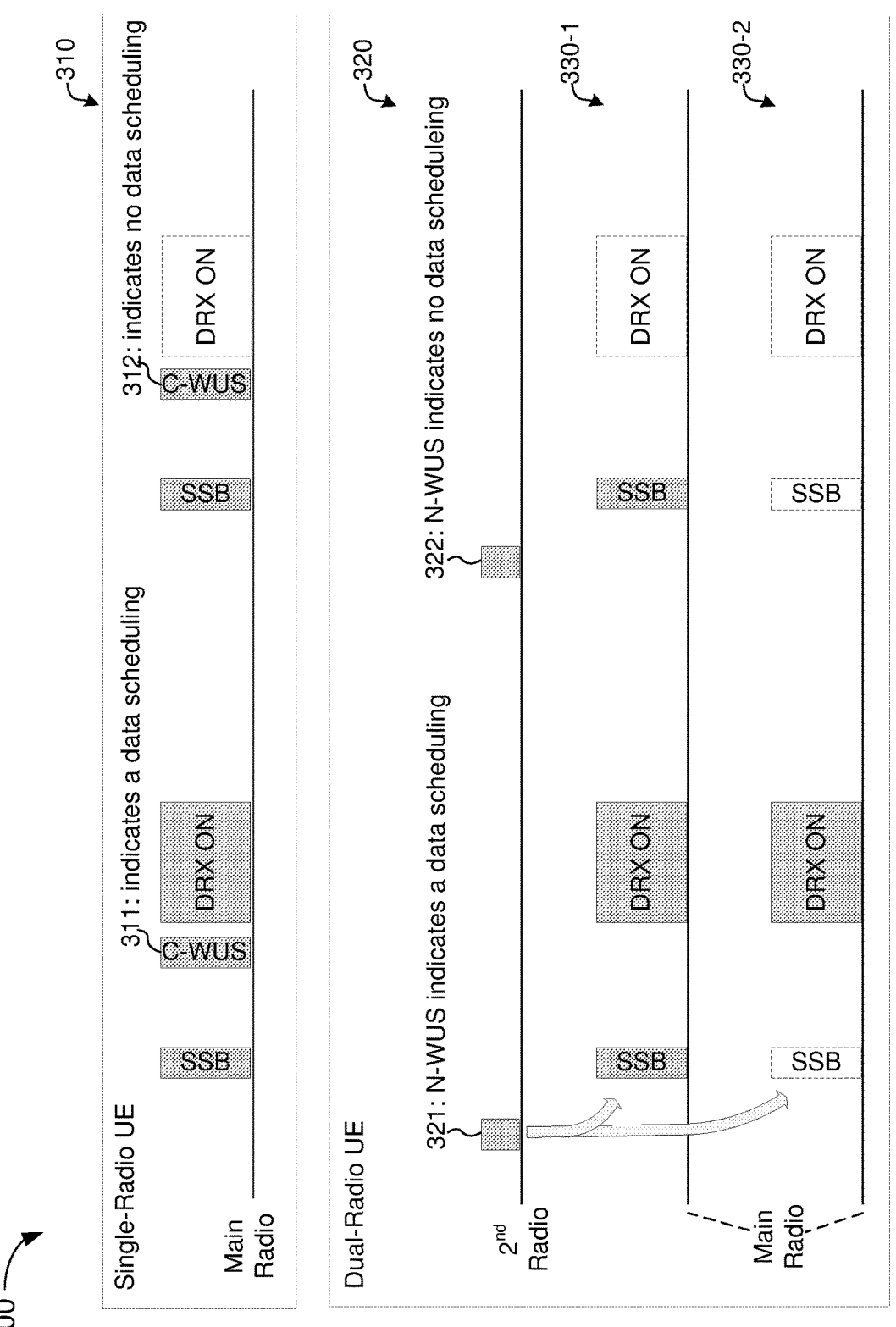
FIG. 3 is a diagram depicting an example scenario with a novel WUS under schemes in accordance with implementations of the present disclosure.

FIG. 3 illustrates an example scenario 300 with an N-WUS under schemes in accordance with implementations of the present disclosure. Scenario 300 illustrates the concept of applying N-WUS for enhanced power saving during DRX operations. Diagram 310 depicts the SSB transmission scheme in the DRX operations with C-WUS for a single-radio UE, where LOOP operations (including automatic gain control (AGC), frequency tracking loop (FTL), and time tracking loop (TTL)) and measurements (MEAS) can only be performed in certain occasions, e.g., during SSB/TRS bursts. The single-radio UE wakes up the main radio for SSB/TRS receptions, e.g., every 20 ms (every 2 radio frames). In diagram 310, a C-WUS is detected before a DRX ON period. If the received C-WUS 311 indicates that there is a data scheduling for the UE, then the UE may need to wake up the main radio for the upcoming DRX ON period. Otherwise, if the received C-WUS 312 indicates that there is no data scheduling for the UE, then the main radio may enter the sleep mode for the upcoming DRX ON period.

Diagrams 320, 330-1, and 330-2 depict the SSB transmission scheme in the DRX operations with N-WUS for a dual-radio UE (e.g., operating in RRC idle state or RRC inactive state). In diagram 320, an N-WUS is detected by the secondary radio (e.g., the WuRx radio 222) before an SSB (e.g., the (second/third) last SSB before an DRX ON period). If the received N-WUS 321 indicates that there is a data scheduling for the UE, then the UE may need to wake up the main radio (e.g., the main radio 221) for the upcoming DRX ON period. Otherwise, if the received N-WUS 322 indicates that there is no data scheduling for the UE, then the main radio may enter the sleep mode for the upcoming DRX ON period. Note that, in diagram 330-1, the main radio may still need to wake up for SSB/TRS reception even when the received N-WUS indicates no data scheduling, due to that the SSB/TRS reception may be required for other purposes or operations, such as time and/or frequency synchronization, and signal quality measurement. Alternatively, in diagram 330-2, the N-WUS may also be used for time and/or frequency synchronization, and/or signal quality measurement (e.g., radio resources management (RRM) measurement for serving and/or neighboring cell(s)), such that the main radio may not need to wake up for SSB/TRS reception, regardless of whether the received N-WUS indicates a data scheduling or not.

In view of the above, the present disclosure proposes schemes pertaining to power saving enhancements with a novel/new WUS for a dual-radio system. According to some schemes of the present disclosure, a secondary radio is introduced to handle N-WUS monitoring, the power-hungry main radio is allowed to stay in the sleep mode longer. By applying the schemes of the present disclosure, further power saving may be realized by reducing the wake-up energy overhead of the main radio. Specifically, the N-WUS may be applied for at least one of the following functions or operations: (1) time and/or frequency synchronization, (2) indication of whether to wake up the main radio, and (3) signal quality measurement. In some implementations, the signal quality measurement includes radio resources management (RRM) measurement, radio link monitoring (RLM) measurement, and/or beam failure detection (BFD) measurement. In some implementations, the RRM measurement is performed for at least one of a serving cell and a neighboring cell, and the N-WUS includes information for cell recognition when the RRM measurement is performed for both the serving cell and the neighboring cell. In some implementations, the signal quality measurement is performed via the secondary radio based on the N-WUS, or is performed with assistance of the N-WUS (e.g., performed via the main radio when the signal quality of the N-WUS is below a threshold).

In addition, considering that coverage enhancement of the N-WUS may be needed for a large cell (e.g., with Inter-Site Distance (ISD)=500 m), the present disclosure proposes that a network node (e.g., a base station) may apply certain technique, such as repetitions (e.g., for Frequency Range 1 (FR1)), or beamforming (e.g., for Frequency Range 2 (FR2)), on the N-WUS transmission to reduce signaling overhead. Accordingly, the UE may need to report beam relevant information to the base station, e.g., when the UE is operating in the RRC inactive state. The beam information may be acquired at the network side explicitly or implicitly. For implicitly signaling, the beam information may be derived/delivered based on the mapping/association between an SSB and a PUSCH occasion. For explicit signaling, the beam information, such as SSB index with the strongest reference signal receiving power (RSRP) at UE side, may be reported. That is, the UE may measure, via the main radio, one or more SSBs for beam selection, and the beam information may include the index of the SSB measured with the strongest RSRP. With either explicit signaling or implicitly signaling, the N-WUS is transmitted at the reported/selected beam direction to save signaling overhead, i.e., the N-WUS is quasi-co-located (QCLed) with SSB reported/selected by the UE (e.g., the N-WUS is transmitted from the same Active Antenna Unit (AAU)). Alternatively, the WUS may not be QCLed with SSB, e.g., when the technique of repetitions on the N-WUS transmission is applied.

Figure 4:
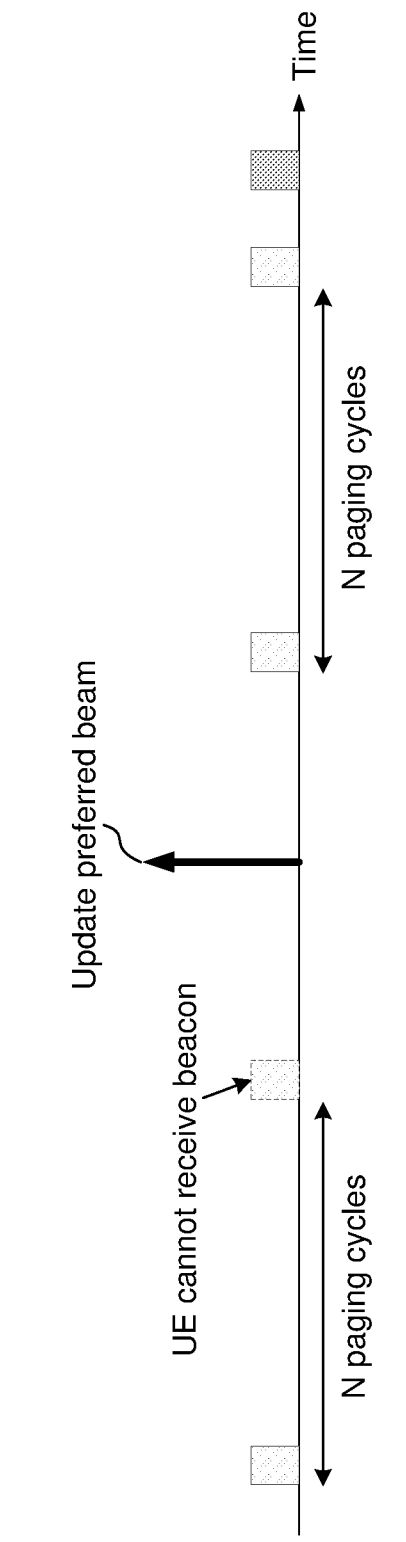
FIG. 4 is a diagram depicting an example scenario with additional beacon for beam quality check in accordance with implementations of the present disclosure.

In some implementations, for explicit signaling, the UE may measure SSB for beam selection and update/report preferred beam (if needed). For example, UE may periodically turn on the main radio to measure SSBs for beam selection, and the periodicity may be long, e.g., N paging cycles configured by BS. Alternatively, the UE may a-periodically measure SSBs for beam selection, e.g., only when main receiver is turned on. In some implementations, the UE may check beam quality based on the N-WUS, and when the signal strength of the N-WUS is below a threshold or the UE cannot receive the N-WUS, the UE may turn on the main radio to measure SSBs for beam selection and update/report best/preferred beam. In this case, the N-WUS is always transmitted to indicate whether to turn on main receiver, e.g., bit 0/1 indicates sleep/wakeup. In some implementations, an additional signal, e.g., analogous to a beacon or a secondary synchronization signal (SSS) only, is introduced for beam quality check for the secondary radio. For example, the BS may periodically send this additional signal at the reported beam direction, and if the signal quality of this additional signal measured by the secondary radio is below a threshold or the secondary radio at the UE side cannot receive this additional signal, the UE may turn on the main radio to measure SSBs for beam selection and update preferred beam. Alternatively, the BS may periodically send this additional signal in a beam sweeping manner, and the UE may perform beam quality check and beam selection, i.e., select the best/preferred beam, based on the signal quality measured at each beam direction by the secondary radio. That is, the main radio doesn't have to be turned on during reception of this additional signal. The periodicity may be long, e.g., N paging cycles configured by the BS. The N-WUS may or may not co-exist with this additional signal. In some implementations, the PUSCH occasion for beam reporting may be QCLed with the signal for beam quality check or beam selection, including SSB, N-WUS, and beacon, and thus, the UE may select PUSCH occasion based on SSB/N-WUS/beacon. In some implementations, the threshold for beam quality check may be configured by RRC signaling. In some implementations, for coverage enhancement, the N-WUS is transmitted to the UE in a beam sweeping manner or in a repetition manner when the UE is operating in the RRC idle state. FIG. 4 illustrates an example scenario 400 with additional beacon for beam quality check in accordance with implementations of the present disclosure. In diagram 400, an additional beacon for beam quality check co-exists with the N-WUS, and the additional beacon is periodically sent with a periodicity=N paging cycles.

According to some schemes of the present disclosure, the N-WUS may be applied when the UE is operating in the RRC connected state. In this case, the N-WUS can be used for signal quality measurement (e.g., RRM/RLM/BFD measurement). For example, the UE may perform RRM/RLM/ BFD measurement directly based on the N-WUS. Alternatively, the UE may perform RRM/RLM/BFD measurement with the assistance of the N-WUS. Therefore, the N-WUS may provide additional gain for sparse traffic (e.g., instant message application (APP)), when compared to the conventional WUS.

Illustrative Implementations

Figure 5:
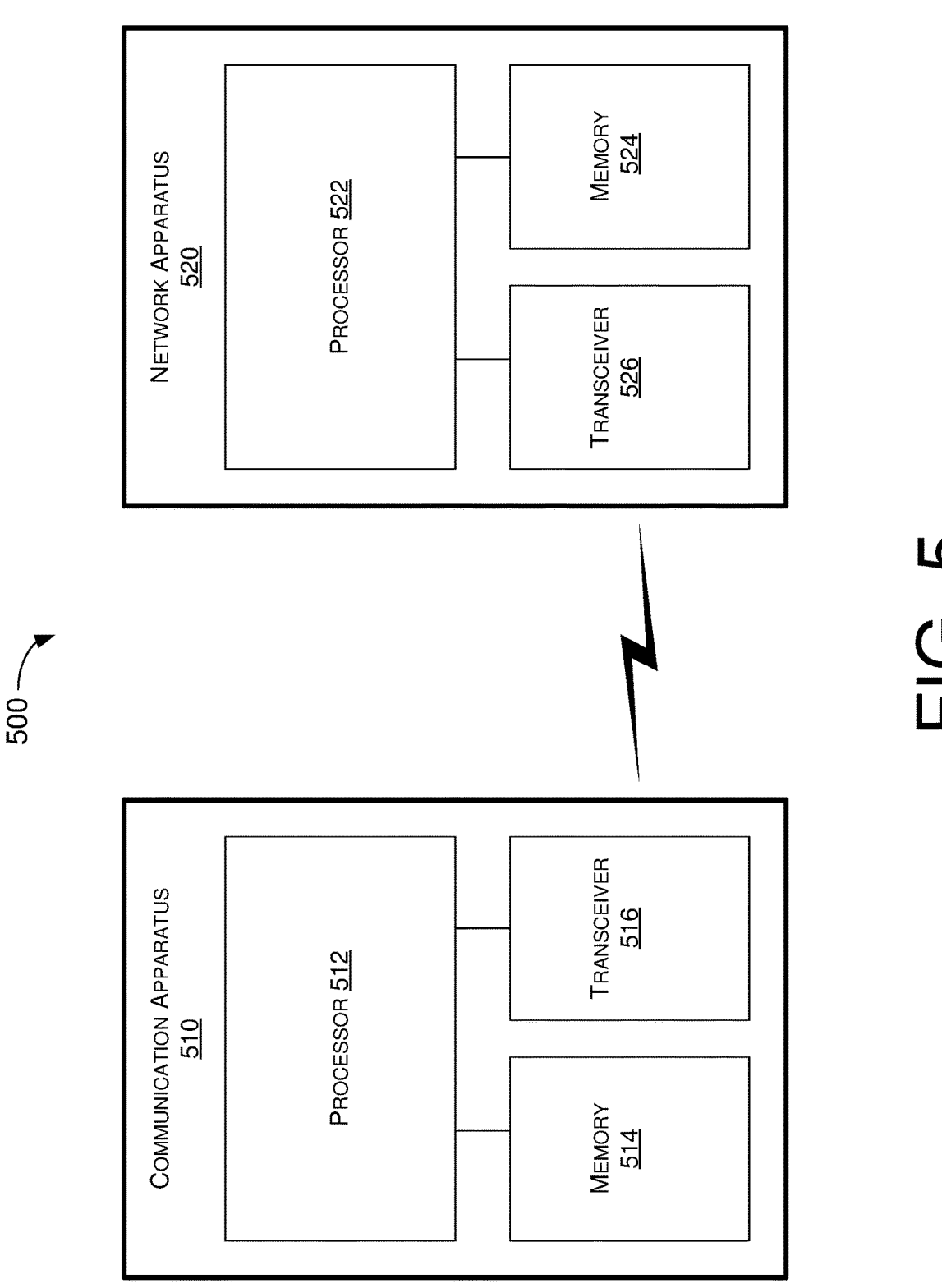
FIG. 5 is a block diagram of an example communication system in accordance with an implementation of the present disclosure.

FIG. 5 illustrates an example communication system 500 having an example communication apparatus 510 and an example network apparatus 520 in accordance with an implementation of the present disclosure. Each of communication apparatus 510 and network apparatus 520 may perform various functions to implement schemes, techniques, processes and methods described herein pertaining to power saving enhancements with a wake-up signal for a dual-radio system, including scenarios/schemes described above as well as process 600 described below.

Communication apparatus 510 may be a part of an electronic apparatus, which may be a UE such as a portable or mobile apparatus, a wearable apparatus, a wireless communication apparatus or a computing apparatus. For instance, communication apparatus 510 may be implemented in a smartphone, a smartwatch, a personal digital assistant, a digital camera, or a computing equipment such as a tablet computer, a laptop computer or a notebook computer. Communication apparatus 510 may also be a part of a machine type apparatus, which may be an IoT, NB-IoT, or IIoT apparatus such as an immobile or a stationary apparatus, a home apparatus, a wire communication apparatus or a computing apparatus. For instance, communication apparatus 510 may be implemented in a smart thermostat, a smart fridge, a smart door lock, a wireless speaker or a home control center. Alternatively, communication apparatus 510 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Communication apparatus 510 may include at least some of those components shown in FIG. 5 such as a processor 512, for example. Communication apparatus 510 may further include one or more other components not pertinent to the proposed scheme of the present disclosure (e.g., internal power supply, display device and/or user interface device), and, thus, such component(s) of communication apparatus 510 are neither shown in FIG. 5 nor described below in the interest of simplicity and brevity.

Network apparatus 520 may be a part of an electronic apparatus, which may be a network node such as a base station, a small cell, a router or a gateway. For instance, network apparatus 520 may be implemented in an eNodeB in an LTE, LTE-Advanced or LTE-Advanced Pro network or in a gNB in a 5G, NR, IoT, NB-IoT or IIoT network. Alternatively, network apparatus 520 may be implemented in the form of one or more IC chips such as, for example and without limitation, one or more single-core processors, one or more multi-core processors, or one or more RISC or CISC processors. Network apparatus 520 may include at least some of those components shown in FIG. 5 such as a processor 522, for example. Network apparatus 520 may further include one or more other components not pertinent to the proposed scheme of the present disclosure (e.g., internal power supply, display device and/or user interface device), and, thus, such component(s) of network apparatus 520 are neither shown in FIG. 5 nor described below in the interest of simplicity and brevity.

In one aspect, each of processor 512 and processor 522 may be implemented in the form of one or more single-core processors, one or more multi-core processors, or one or more CISC processors. That is, even though a singular term "a processor" is used herein to refer to processor 512 and processor 522, each of processor 512 and processor 522 may include multiple processors in some implementations and a single processor in other implementations in accordance with the present disclosure. In another aspect, each of processor 512 and processor 522 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 512 and processor 522 is a special-purpose machine specifically designed, arranged and configured to perform specific tasks including autonomous reliability enhancements in a device (e.g., as represented by communication apparatus 510) and a wireless network (e.g., as represented by network apparatus 520) in accordance with various implementations of the present disclosure.

In some implementations, communication apparatus 510 may also include a transceiver 516 (e.g., the dual-radio device 220 in FIG. 2) coupled to processor 512 and capable of wirelessly transmitting and receiving data. In some implementations, communication apparatus 510 may further include a memory 514 coupled to processor 512 and capable of being accessed by processor 512 and storing data therein. In some implementations, network apparatus 520 may also include a transceiver 526 coupled to processor 522 and capable of wirelessly transmitting and receiving data. In some implementations, network apparatus 520 may further include a memory 524 coupled to processor 522 and capable of being accessed by processor 522 and storing data therein. Accordingly, communication apparatus 510 and network apparatus 520 may wirelessly communicate with each other via transceiver 516 and transceiver 526, respectively. To aid better understanding, the following description of the operations, functionalities and capabilities of each of communication apparatus 510 and network apparatus 520 is provided in the context of a mobile communication environment in which communication apparatus 510 is implemented in or as a communication apparatus or a UE and network apparatus 520 is implemented in or as a network node of a wireless network.

In some implementations, processor 512 may configure the main radio of the transceiver 516 to enter a sleep mode and the secondary radio of the transceiver 516 to be (always) in an active mode. Then, processor 512 may receive, via the secondary radio, a first signal (e.g., an N-WUS) from the network apparatus 520. Also, processor 512 may apply the first signal for at least one of: (1) a time or frequency synchronization with the network apparatus 520; (2) an indication of whether to wake up the main radio from the sleep mode; and (3) a signal quality measurement.

Illustrative Processes

FIG. 6 illustrates an example process 600 in accordance with an implementation of the present disclosure. Process 600 may be an example implementation of above scenarios/schemes, whether partially or completely, with respect to power saving enhancements with a wake-up signal for a dual-radio system. Process 600 may represent an aspect of implementation of features of communication apparatus 510. Process 600 may include one or more operations, actions, or functions as illustrated by one or more of blocks 610 to 630. Although illustrated as discrete blocks, various blocks of process 600 may be divided into additional blocks, combined into fewer blocks, or eliminated, depending on the desired implementation. Moreover, the blocks of process 600 may be executed in the order shown in FIG. 6 or, alternatively, in a different order. Process 600 may be implemented by communication apparatus 510 or any suitable UE or machine type devices. Solely for illustrative purposes and without limitation, process 600 is described below in the context of communication apparatus 510. Process 600 may begin at block 610.

At 610, process 600 may involve a processor (e.g., processor 512) of an apparatus (e.g., communication apparatus 510) configuring the main radio of a transceiver (e.g., transceiver 516) to enter a sleep mode and the secondary radio of the transceiver (e.g., transceiver 516) to be in an active mode. Process 600 may proceed from 610 to 620.

At 620, process 600 may involve the processor receiving, via the secondary radio, a first signal from a network node (e.g., network apparatus 520). Process 600 may proceed from 620 to 630.

At 630, process 600 may involve the processor applying the first signal for at least one of: (1) a time or frequency synchronization with the network apparatus 520; (2) an indication of whether to wake up the main radio from the sleep mode; and (3) a signal quality measurement.

In some implementations, the secondary radio is a low-power receiver, and the first signal is in a specific waveform that the low-power receiver is capable of processing.

In some implementations, the signal quality measurement includes at least one of: an RRM measurement, an RLM measurement, and a BFD measurement.

In some implementations, the RRM measurement is performed for at least one of a serving cell and a neighboring cell, and the first signal includes information for cell recognition when the RRM measurement is performed for both the serving cell and the neighboring cell.

In some implementations, the signal quality measurement is performed via the secondary radio based on the first signal, or is performed via the main radio when a signal quality of the first signal is below a threshold.

In some implementations, process 600 may further involve reporting, via the main radio, beam information to the network node when the apparatus is operating in an RRC inactive state. The beam information indicates a selected beam, and the first signal is transmitted to the apparatus at a direction of the selected beam.

In some implementations, process 600 may further involve measuring, via the main radio, one or more SSBs for beam selection. The beam information comprises an index of one of the one or more SSBs with a strongest RSRP.

In some implementations, the beam information is delivered based on an association between an SSB and a PUSCH occasion.

In some implementations, measuring the one or more SSBs is performed periodically or only when the main radio is woken up from the sleep mode.

In some implementations, measuring the one or more SSBs is performed when a signal strength of the first signal is below a threshold.

In some implementations, process 600 may further involve receiving, via the secondary radio, a second signal from the network node. The second signal comprises a beacon or an SSS only.

In some implementations, the second signal is transmitted to the apparatus in a beam sweeping manner to assist the apparatus with beam selection.

In some implementations, the first signal is transmitted to the apparatus in a beam sweeping manner or in a repetition manner when the apparatus is operating in an RRC idle state.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

12

What is claimed is:

1. A method, comprising:
configuring, by a processor of an apparatus, a main radio of the apparatus to enter a sleep mode and a secondary radio of the apparatus to be in an active mode;
receiving, via the secondary radio, a first signal from a network node;
applying, by the processor, the first signal for at least one of:
a time or frequency synchronization with the network node;
an indication of whether to wake up the main radio from the sleep mode; and
a signal quality measurement; and
reporting, via the main radio, beam information to the network node when the apparatus is operating in a radio resource control (RRC) inactive state, wherein the beam information indicates a selected beam, and the first signal is transmitted to the apparatus at a direction of the selected beam.

2. The method of claim 1, wherein the secondary radio is a low-power receiver, and the first signal is in a specific waveform that the low-power receiver is capable of processing.

3. The method of claim 1, wherein the signal quality measurement comprises at least one of:
a radio resources management (RRM) measurement;
a radio link monitoring (RLM) measurement; and
a beam failure detection (BFD) measurement.

4. The method of claim 3, wherein the RRM measurement is performed for at least one of a serving cell and a neighboring cell, and the first signal comprises information for cell recognition when the RRM measurement is performed for both the serving cell and the neighboring cell.

5. The method of claim 1, wherein the signal quality measurement is performed via the secondary radio based on the first signal, or is performed via the main radio when a signal quality of the first signal is below a threshold.

6. The method of claim 1, further comprising:
measuring, via the main radio, one or more synchronization signal blocks (SSBs) for beam selection;
wherein the beam information comprises an index of one of the one or more SSBs with a strongest reference signal receiving power (RSRP).

7. The method of claim 1, wherein the beam information is delivered based on an association between an SSB and a physical uplink shared channel (PUSCH) occasion.

8. The method of claim 6, wherein measuring the one or more SSBs is performed periodically or only when the main radio is woken up from the sleep mode.

9. The method of claim 6, wherein measuring the one or more SSBs is performed when a signal strength of the first signal is below a threshold.

10. The method of claim 1, further comprising:
receiving, via the secondary radio, a second signal from the network node, wherein the second signal comprises a beacon or a secondary synchronization signal (SSS) only.

11. The method of claim 10, further comprising:
measuring, via the main radio, one or more synchronization signal blocks (SSBs) for beam selection when a signal strength of the second signal is below a threshold;
wherein the second signal is transmitted to the apparatus at the direction of the selected beam.

12. The method of claim 10, wherein the second signal is transmitted to the apparatus in a beam sweeping manner to assist the apparatus with beam selection.

13. The method of claim 1, wherein the first signal is transmitted to the apparatus in a beam sweeping manner or in a repetition manner when the apparatus is operating in an RRC idle state.

14. An apparatus, comprising:

a transceiver which, during operation, wirelessly communicates with a network node of a wireless network, wherein the transceiver comprises a main radio and a secondary radio; and a processor communicatively coupled to the transceiver such that, during operation, the processor performs operations comprising:

configuring the main radio to enter a sleep mode and the secondary radio to be in an active mode;

receiving, via the secondary radio, a first signal from the network node; and applying the first signal for at least one of:

a time or frequency synchronization with the network node;

an indication of whether to wake up the main radio from the sleep mode; and a signal quality measurement; and reporting, via the main radio, beam information to the network node when the apparatus is operating in a radio resource control (RRC) inactive state, wherein the beam information indicates a select beam, and the first signal is transmitted to the apparatus at a direction of the selected beam.

15. The apparatus of claim 14, wherein the secondary radio is a low-power receiver, and the first signal is in a specific waveform that the low-power receiver is capable of processing.

16. The apparatus of claim 14, wherein the signal quality measurement comprises at least one of:

a radio resources management (RRM) measurement;

a radio link monitoring (RLM) measurement; and a beam failure detection (BFD) measurement.

17. The apparatus of claim 16, wherein the RRM measurement is performed for at least one of a serving cell and a neighboring cell, and the first signal comprises information for cell recognition when the RRM measurement is performed for both the serving cell and the neighboring cell.

18. The apparatus of claim 14, wherein the signal quality measurement is performed via the secondary radio based on the first signal, or is performed via the main radio when a signal quality of the first signal is below a threshold.

* * * * *